Oct. 22, 1957          R. W. GILBERT          2,810,867
METHOD FOR PULLING DOWN MAGNETS
Filed Feb. 28, 1955          2 Sheets—Sheet 1
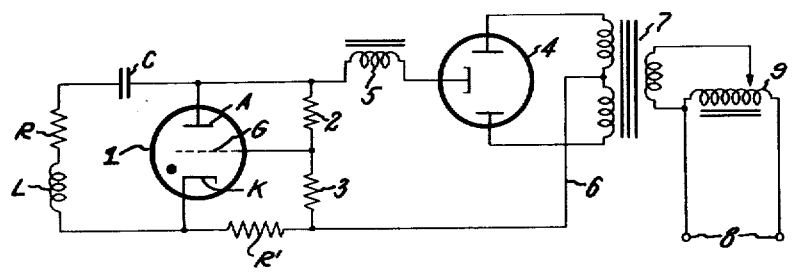
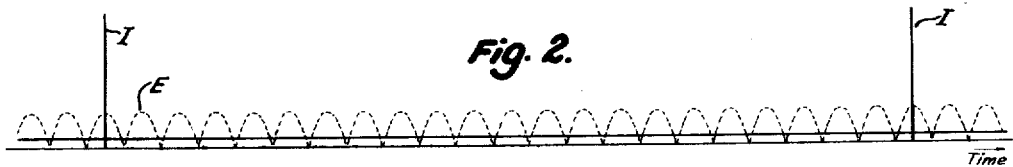
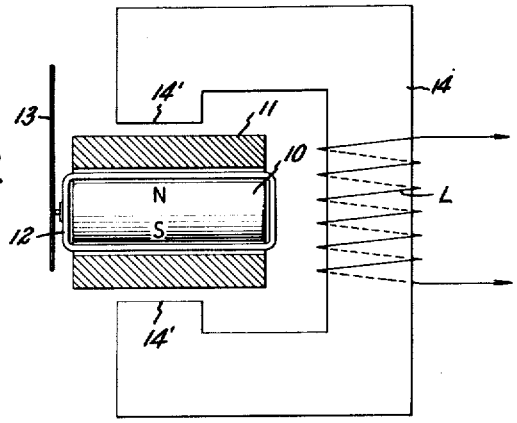
INVENTOR
ROSWELL W. GILBERT
BY Rudolph Hurick
ATTORNEY Oct. 22, 1957  R. W. GILBERT  2,810,867
METHOD FOR PULLING DOWN MAGNETS
Filed Feb. 28, 1955  2 Sheets-Sheet 2

INVENTOR
ROSWELL W. GILBERT
BY Rudolph J. Jurick
ATTORNEY

United States Patent Office 2,810,867
Patented Oct. 22, 1957

2,810,867

METHOD FOR PULLING DOWN MAGNETS

Roswell W. Gilbert, Montclair, N. J., assignor to Weston Electrical Instrument Corporation, Newark, N. J., a corporation of New Jersey Application February 28, 1955, Serial No. 491,108

1 Claim. (Cl. 317—157.5)

This invention relates to a method of selectively decreasing the strength of permanent magnet systems, such as used in direct current measuring instruments, and to apparatus for operation in accordance with that method.

In the manufacture of electrical measuring instruments of the permanent magnet, movable-coil type, the permanent magnet structure is first fully charged and, after assembly in an instrument, it is subjected to a demagnetizing process to reduce the magnetization to that value at which the instrument pointer aligns with the top scale graduation when full scale current flows through the moving coil. This process is known as "pulldown" and it has heretofore been effected by bringing a coil traversed by 60 cycle alternating current slowly near the instrument while passing full scale direct current through the instrument movable coil. As the demagnetizing coil approaches the instrument, the magnetic field structure is pulled down and, when the instrument pointer is aligned with the top scale graduation, the demagnetizing coil is removed.

The development of improved permanent magnet materials of high coercive force and the accompanying requirements for higher demagnetizing field strengths has led to brute force equipment designs, and the high level of average energy produced an excessive injection of energy into the instrument movable system, thereby resulting in violent pointer reaction which made it difficult to identify the instant of desired adjustment of the instrument magnetic system.

An object of this invention is the provision of a novel method of and apparatus for selectively adjusting the strength of a permanent magnet.

An object of this invention is the provision of a magnet pull-down method and apparatus which are characterized by the cyclic production of demagnetizing pulses of extremely short duration.

An object of this invention is the provision of a magnet pull-down method which comprises the steps of arranging a pull-down coil in fixed position proximate to the permanent magnet, energizing the pull-down coil with repeated current pulses of short duration and increasing the magnitude of the pulses until a desired pull-down of the magnet strength is effected.

An object of this invention is the provision of apparatus for adjusting the strength of a permanent magnet and including a circuit for developing spaced current pulses of adjustably controlled magnitude.

These and other objects and the advantages of the invention will be apparent from the following specification when taken with the accompanying drawings illustrative of the method and apparatus embodiments of the invention. It is to be understood that the drawings are for the purpose of illustration and are not to be construed as defining the scope or limits of the invention, reference being had for the latter purpose to the appended claim.

In the drawings wherein like reference numerals denote like parts in the several views:

Figure 1 is a circuit diagram of magnetic pull-down circuit embodying the invention;

Figure 2 is a time-voltage chart illustrative of the pulsing pull-down method of the invention; and Figures 3, 4 and 5 are schematic views of pull-down apparatus associated with different types of electrical instruments.

Figure 4:
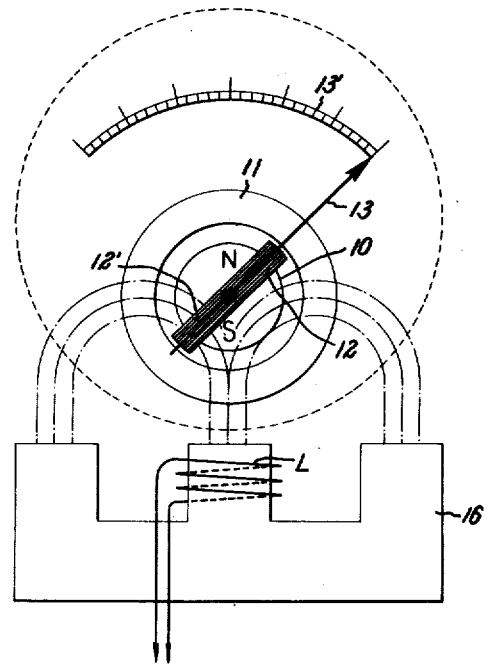

A magnet pull-down circuit made in accordance with my invention comprises, broadly, a tank condenser that is charged through a series resistor from a direct current source. A thyratron tube of suitable peak current capacity is arranged to fire at a selected value of condenser voltage to thereby discharge the condenser through the pull-down coil. This action is recurrent as a relaxation oscillator.

Reference is made to the circuit diagram of Figure 1 wherein the character L identifies the pull-down coil which receives periodic current pulses from a condenser C through a resistor R, the time constants of these elements being such that the duration of the current pulse is of the order of one or two milliseconds. This discharge circuit constitutes the anode circuit of a thyratron tube 1 having a grid G connected to the junction of resistors 2 and 3 which are serially connected between the anode A and one terminal of a series charging resistor R' whose other terminal is connected to the tube cathode K. The anode voltage is applied in conventional manner by a full wave rectifier tube 4 through a filter choke 5, and the return lead 6 of the power transformer 7 is connected to the cathode K through resistor R'. The primary of the power transformer is connected to the usual 60 cycle light and power circuit, indicated by terminals 8, through an adjustable transformer 9 which permits adjustment of the anode voltage.

The voltage across the condenser C builds up with time as a result of the relatively low charging current passed through the inductor 5 until it reaches a critical value at which the tube is rendered conductive by the selected fraction of the anode voltage that is applied to the grid G through the voltage divider comprising resistors 2 and 3. Current pulses I are discharged through the pull-down coil L at the instants of tube conductivity, and the value of resistor R' is so chosen or adjusted with reference to the capacitance of condenser C that the current pulses occur at a rate of four or five per second. This is indicated graphically in Figure 2 in which dotted line curve E indicates the rectified 60 cycle variation of the voltage impressed on the anode A, the line $i$ represents the low condenser-charging current, and the cyclic discharge of current through the pull-down coil is indicated by the pulses I. The average energy input to the pull-down coil is only a small fraction of that according to the prior method of direct energization with 60 cycle current and there is no problem of designing the pull-down coil to avoid excessive heating.

The time duration of the peak current flowing in the pull-down coil need only be very small to effect a pulling down of a permanent magnet. For example, a current duration peak of one millisecond is almost as effective as a continuous current of equal magnitude and the current peaks need be repeated only at a rate of about five per second to provide a practical means for smoothly decreasing the strength of an instrument magnet to a desired value. In order to determine how long the current pulse time need be, it is necessary to consider the time coefficients effective within the magnet. Fortunately, the only significant factor, in this respect, is the eddy current time factor. The time constant of the eddy current reaction is essentially an $L/R$ ratio time constant, with inductance (L) a function of the included magnetic flux and resistance (R) being the resistance around the path including the flux. Since inductance is an area parameter whereas resistance is a circumferential parameter, the time constants of magnets of similar shape and material may be expected to increase directly as the linear dimension. The complex situations introduced by different magnet shapes, the apparently indeterminable resistance and permeability distributions, and the generally non-linear nature of the magnet materials, defeat mathematical calculation as a practical approach. However, approximate measurement indicates a time constant of 0.1 millisecond for Alnico magnets having a ⅝ inch square section and 2.0 milliseconds for a cobalt magnet of similar section. The difference apparently develops from the higher permeability and lower resistance of the cobalt magnet material.

The pull-down coil has an inductance (L) and a resistance (R) and when it is connected to the tank condenser (C) a series LCR surge of half-cycle duration is obtained. Preferably, the surge circuit should be considerably underdamped in which case the surge time constant, $t_0$, may be stated as:

$$t_0 = \sqrt{LC} \text{ (seconds per radian)}$$

and the large timer constant of the coil ($t_c$) is:

$$t_c = \frac{L}{R} \text{ (seconds)}$$

Underdamping is desirable because the condenser will then discharge through zero to a charge of opposite voltage approaching the voltage level at the time of thyratron firing. Thus, the surge excursion may be made larger than the original charge voltage with consequent economy of condenser design.

Neglecting the damping loss, the current peak (I max), through the coil may be calculated on the basis of the charge energy (W) transferred from the condenser, charged to a peak value (E max), to the coil inductance (L) charged to I max. Thus, $$W = E_{max}^2 C = I_{max}^2 L$$

from which:

$$I \text{ max} = E \text{ max} \sqrt{\frac{C}{L}}$$

wherein $$\sqrt{\frac{C}{L}}$$

is recognizable as the surge admittance of the LC combination.

The time constants, $t_c$, of air-cored coils of similar size, shape and copper mass, are similar regardless of the number of turns, since both resistance and inductance vary as the square of the turns. Therefore, the logical design procedure is to first determine a safe value of $t_0$ with respect to the eddy current situation, select a $t_c$ about three (3) times as large, and from this determine the size of the pull-down coil required in terms of copper mass and shape. The required inductance may then be calculated from the relationship $t_0 = \sqrt{LC}$ (assuming a condenser of adequate size), and the number of turns and wire size determined accordingly. In specific cases, no difficulty has been experienced in obtaining a sufficiently high $t_c$ with coils of nominal size. Specific design experience may indicate that $t_c$ may be neglected as a limit. In such cases the circuit damping may be checked experimentally by observing the ratio of reverse to forward voltage developed on the tank condenser. This may conveniently be measured by charging the condenser to a known voltage, disconnecting the charging source, firing the thyratron tube, and measuring the resultant reverse voltage left on the capacitor. The reverse voltage should be of the order of 60% of the initial forward voltage, or larger.

Also, $t_0$ may be measured experimentally by oscilloscope timing of the potential in the pull-down coil circuit by means of a loosely-coupled turn pickup. The total duration of the transient will be one-half cycle of oscillation or, $\pi t_0$, and $t_0$ is the measured duration divided by $\pi$.

It is pointed out that the pull-down coil L is in series with the tank condenser C and, therefore, can carry no direct current as such and cannot subject an instrument (containing the magnet being pulled down) to a direct current flux. The current-time integral of the surge is compensated by the current-time integral of the charging current, with a net resultant steady-state zero current.

The adjustment of the magnetic system is greatly facilitated since the movable system of an instrument does not vibrate with demagnetizing pulses of short duration which are repeated at the relatively slow rate of but four or five pulses per second, and the magnitude of the demagnetizing action is adjusted by voltage regulation and not by moving the pull-down coil to and away from the instrument.

Relatively simple and light weight constructions for the pull-down coil are possible with the pulsing pull-down method.

With a magnetic core instrument which is uncased or is within a cylindrical case of small diameter, apparatus as shown in Figure 3 is appropriate and convenient. As shown schematically, the instrument includes a transversely magnetized cylindrical magnet 10 within and radially spaced from a soft-iron cylindrical yoke 11 by an air gap in which a movable system comprising a frame 12 carrying a wire wound coil, not shown, and a pointer 13 is supported for angular movement. When the instrument is uncased or within a small cylindrical case, the pull-down core L is wound on an approximately C-shaped yoke 14 of soft iron laminations arranged in fixed position with its polar ends 14' at opposite sides of the soft iron yoke. The plane of maximum magnetization of core 10 is of course located in the plane of symmetry through the polar ends 14' of the yoke.

Full scale current is passed through the movable coil of the instrument, and the magnitude of the current pulses through winding L is progressively increased, by adjustment of the variable transformer 9 (Figure 1), until the pointer 13 aligns with the top graduation of the scale plate, not shown. There is no uncertainty as to the correct adjustment of the instrument magnetization since the pointer 13 does not vibrate with the current pulses and the voltage magnitude may be increased at a slow rate to complete the desired pull-down.

In the case of a magnetic core instrument within a relatively large size case 15, the pull-down coil L is placed on the center leg of a soft iron laminated yoke 16 of E-shape, see Figure 4, which is arranged with the central plane of this leg in the plane of maximum magnetization of the instrument core 10. In addition to the previously described instrument elements which are identified by the same reference numerals as in Figure 3, the movable coil 12' and graduated scale 13' are illustrated in Figure 4.

Figure 5:
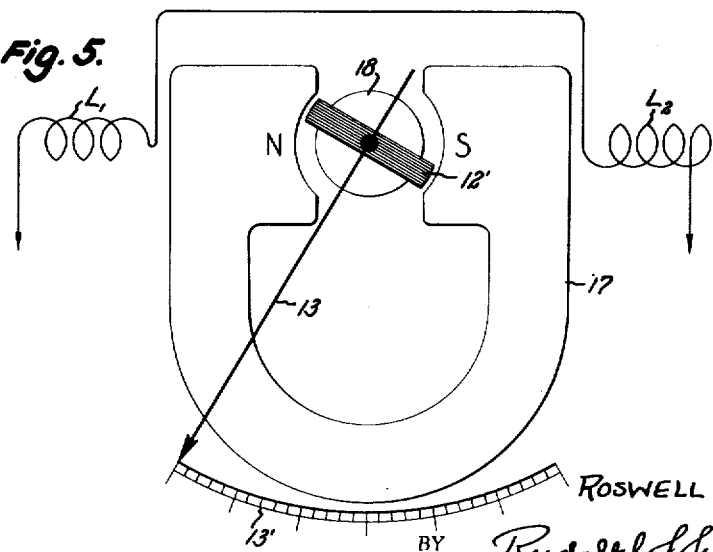

In the case of an instrument with a substantially C-shaped magnet 17 of cobalt steel or the like, a soft iron core 18, and movable coil 12' for displacing a pointer 13 along a scale 13', see Figure 5, it is not necessary to employ an iron yoke for the pull-down coil and it is sufficient to divide the same into two aligned and serially connected sections $L_1$, $L_2$ arranged in fixed position at opposite sides of the polar sections of the magnet.

While the invention has been described in connection with the manufacture of electrical measuring instruments, it is apparent that the method and apparatus may be employed in any case in which the magnetization of a permanent magnet is to be reduced from a fully charged state to a lesser value. In each case, the pull-down coil is so arranged that the magnetic flux resulting from the current pulses passed through the coil is in a direction to decrease the strength of the permanent magnet being treated.

Having now described my invention in accordance with the requirements of the patent statutes what I desire to protect by Letters Patent of the United States is set forth in the following claim.

I claim:

A method of decreasing the strength of a permanent magnet comprising arranging a pull-down coil in fixed position adjacent the magnet, and cyclically energizing the coil with current pulses of predetermined magnitude, said current pulses having a time duration of the order of a few milliseconds and a frequency of the order of 5 cycles per second, and the magnetic flux resulting from the flow of the current pulses through the pull-down is in a direction to decrease the strength of the magnet.

References Cited in the file of this patent

UNITED STATES PATENTS

| 2,397,116 | Armstrong | Mar. 26, 1946 |
| 2,475,063 | Thalner | July 5, 1949 |
| 2,578,043 | Christy | Dec. 11, 1951 |

FOREIGN PATENTS

| 543,148 | Great Britain | Feb. 12, 1942 |

UNITED STATES PATENT OFFICE

CERTIFICATE OF CORRECTION

Patent No. 2,810,867                                                 October 22, 1957

Roswell W. Gilbert

It is hereby certified that error appears in the printed specification of the above numbered patent requiring correction and that the said Letters Patent should read as corrected below.

Column 5, line 11, after "pull-down" insert -- coil --.

Signed and sealed this 24th day of December 1957.

(SEAL)
Attest:

KARL H. AXLINE                                             ROBERT C. WATSON
Attesting Officer                                      Commissioner of Patents